United States Patent [19]
Yamamura et al.

[11] Patent Number: 5,770,132
[45] Date of Patent: Jun. 23, 1998

[54] TERMINAL TREATMENT DEVICE FOR A PLASTIC FIBER

[75] Inventors: Takehiko Yamamura; Hayato Yuuki, both of Yokkaichi, Japan

[73] Assignee: Sumitomo Wiring Systems, Ltd., Japan

[21] Appl. No.: 494,267

[22] Filed: Jun. 23, 1995

[30] Foreign Application Priority Data

Jun. 24, 1994 [JP] Japan .................................. 6-143514

[51] Int. Cl.⁶ .................................................. B29D 11/00
[52] U.S. Cl. .......................... 264/1.25; 156/294; 264/2.7; 264/248; 425/392; 425/812
[58] Field of Search ................................ 264/1.24, 1.25, 264/1.26, 1.7, 2.7, 248, 249; 425/500, 508, 392, 812; 156/294

[56] References Cited

U.S. PATENT DOCUMENTS

| | | | |
|---|---|---|---|
| 4,510,005 | 4/1985 | Nijman | 156/221 |
| 4,678,268 | 7/1987 | Russo et al. | 264/1.26 |
| 4,695,124 | 9/1987 | Himono et al. | |

FOREIGN PATENT DOCUMENTS

| | | |
|---|---|---|
| 104513 | 4/1985 | European Pat. Off. |
| 393601 | 10/1990 | European Pat. Off. |
| 486206 | 5/1992 | European Pat. Off. |
| 2630730 | 1/1977 | Germany. |
| 55-121405 | 9/1980 | Japan. |
| 58-187903 | 2/1983 | Japan. |
| 59-118433 | 7/1984 | Japan .................... 264/1.25 |
| 2-33005 | 3/1990 | Japan. |
| 6-67032 | 3/1994 | Japan .................... 264/1.24 |
| 6-118276 | 4/1994 | Japan. |

OTHER PUBLICATIONS

Patent Abstracts of Japan, vol. 9 No. 13 (p–328) [1736] Jan. 19, 1985 JPA–59–160,110; Sep. 10, 1984.
Patent Abstracts of Japan, vol. No. 109 (P–564)[2556] Apr. 7, 1987 JPA–61–258203; Nov. 15, 1986.

*Primary Examiner*—Mathieu D. Vargot
*Attorney, Agent, or Firm*—Jordan B. Bierman; Bierman, Muserlian and Lucas

[57] ABSTRACT

The terminal treatment device for a plastic optical fiber is improved so that void formation between the melt zone of the ferrule and the plastic optical fiber is avoided, leading to the prevention of crack formation. The device constitutes a chamber, the upper side of which is open, a heater in the chamber, a heated element which may be at the top of the chamber, and a base frame and a top frame to secure the heated element to the chamber. The element is a rectangular plate, made of a metal having good thermal conductivity and includes a thicker part and a thinner part surrounding it. At the center of the thicker part, there is provided a blind hole into which the tip of the ferrule is fitted. A plurality of heat evacuation vents is formed around this blind hole and elsewhere in the chamber to facilitate cooling.

17 Claims, 7 Drawing Sheets

TERMINAL TREATMENT DEVICE FOR A PLASTIC FIBER

BACKGROUND OF THE INVENTION

1. Field of the Invention

The present invention relates to an apparatus and a process for effecting a thermal treatment of a plastic fiber, such as an optical fiber, composed of a cladded core covered with a coating, whereby an end portion of the fiber is held fast within a ferrule.

Plastic fibers such as optical fibers nowadays find applications in a wide variety of technical fields, covering transport vehicles from cars to aircraft, meteorological observation, industrial and scientific instrumentation, lighting, etc.

In these applications, it is often necessary to terminate a length of plastic fiber in a ferrule.

2. Prior Art

Various methods are known in the prior art for ensuring that the end of the fiber is held fast within the ferrule.

In one example disclosed in JP-A-S58 187 903, once the plastic fiber is fitted into its ferrule, it is submitted to a cold and hot thermal shock e.g. by being exposed for 30 minutes at −40° C. and 30 minutes at 85° C. However, it has been found that this practice causes the plastic fiber to shrink, whereupon the end portion of the fiber tends to become disengaged from its ferrule. The cause of this fiber shrinkage is not yet properly understood. It is nevertheless widely held that it originates from the heating and drawing of the core and cladding during manufacture, which creates a strain between the core and the cladding. Under these conditions, the further addition of heat is thought to give rise to the aforementioned shrinkage.

Another probable cause for this shrinkage resides in the differences in thermal expansion coefficients between the ferrule, coating and cladded core.

In the prior art, the disengagement of the plastic fiber is prevented by fixing the fiber to its ferrule by an adhesive, or by effecting a thermal treatment on the terminal portion of the fiber, such as the so-called "hot plate treatment", or the like.

An example of such a known thermal treatment is illustrated in FIGS. 10 to 14. A plastic fiber 51 is passed through a ferrule 52. The inner surface at the tip of the ferrule is tapered to form a tapered melt zone 52a (FIG. 10). The tip of the fiber is applied against a hot plate 53 having a smooth face (FIG. 11). The heat from the plate 53 causes the tip of the plastic fiber to fuse and flow into the melt zone. In this way, the end of the plastic fiber is prevented from falling off by forming a taper, and its end section is rendered smooth (FIG. 12).

In the above terminal treatment process, it becomes difficult to completely fill all the melt zone 52a with the plastic fiber material when the former becomes large. Consequently, there can exist a void a in the melt zone 52a, especially at the interface between the ferrule 52 and the fused plastic fiber 51, as shown in FIG. 13. To prevent this phenomenon, it could be envisaged to increase the temperature of the hot plate 53. However, there would then occur a tendency for the melted end portion of the plastic fiber 51 to spread out from the end of the ferrule due to the resultant decrease in the viscosity of the plastic material (FIG. 14).

Therefore, voids a are still found to exist between the tapered melt zone 52a and the plastic fiber 51.

When the cold and hot thermal shock testing is carried out on the plastic fiber 51 with such voids, stress becomes concentrated at the interface between the melt zone of the plastic fiber 51 and the zone outside, thus giving rise to a crack.

Also, in known devices, the cooling time of the heating medium after the treatment is in some cases unnecessarily long before the plastic fiber terminal becomes solidified in the ferrule.

SUMMARY AND OBJECTS OF THE INVENTION

In view of these problems, an object of the present invention is to improve the thermal treatment of a plastic fiber terminal and to provide a device for that treatment so as to prevent the formation of a void between the melted plastic fiber and the ferrule, and consequently to prevent the formation of the aforementioned crack.

To this end, the present invention provides a device for treating a plastic fiber terminal comprised of at least a cladded core and a coating, and in which a terminal portion of the cladded core is stripped. The coating terminal portion is passed through a ferrule that has an internal taper and is configured so as to retain the cladded core and the coating such that a tip portion of the cladded core protrudes from an end of the ferrule. The device is also provided with a heating medium and a heating means for heating the heating medium.

The heating medium is held by a base frame having a central aperture and a top frame also having a central aperture, the two frames being configured for supporting the heating medium. The heating medium has relatively thick central area and a relatively thin rim portion. The central area is provided with a blind hole having a base and a sidewall. The blind hole is configured for receiving the terminal of the fiber such that the tip of the cladded core is applied to the base and the sidewall of the blind hole comes into contact with a corresponding sidewall portion of the ferrule. The rim is fixed between the base frame and the top frame by fixing means such that the central area is positioned within the aperture of the top frame.

In this respect, a Japanese patent application Heisi 6-013 428 (not yet published) and corresponding European and US patent applications describe a terminal treatment device comprising a heating medium having a similar blind hole.

In the device according to the present invention, the relatively thick central area having the blind hole and the relatively thin rim are preferably formed by a rest plate having a relatively small surface compared to the surface of a base plate, the rest plate being provided with a through hole and being superposed onto the base plate. The rest plate is thus detachably mounted on the base plate.

Preferably, the top frame has a step-wise structure configured so as to hold both the rest plate and the base plate.

In order to ensure that the end face of the fiber has a smooth surface, base of the blind hole is finished in a mirror-surface fashion.

The heating medium can be in the form of a metal plate to ensure good thermal transfer.

A plurality of heat evacuation vents may be provided in the heating medium.

The device can be constructed in the form of a chamber having walls to which the base frame is fixed by fixing means, the heating means being disposed inside the chamber.

The walls of the chamber can also be provided with at least one vent-hole.

To ensure good control of the heating process, the heating means preferably cooperate with a positioning mechanism for selectively bringing the heating means into contact with the heating medium. A temperature setting mechanism may also be provided.

Typically, the plastic fiber terminal is a plastic optical fiber.

The invention also provides a process for treating a plastic fiber terminal comprised of at least a cladded core and a coating, the process comprising the steps of:

exposing a terminal portion of the cladded core over a predetermined length by stripping the coating;

passing the terminal portion through a ferrule having an internal taper and being configured so as to hold the cladded core and the coating such that a tip portion of the cladded core protrudes from an end of the ferrule;

applying the terminal portion to a heating medium mounted on a chamber having walls and a heating means disposed therein, so that the terminal portion fuses to form a melt zone, whereby the fiber terminal is rendered non-retractable from the ferrule;

wherein the tip of the cladded core and an edge portion of the ferrule are received in a blind hole formed in the heating medium and having a base and a sidewall such that the terminal portion is heated both by the base and the sidewall, and wherein waste heat is evacuated through vents provided in one or both of the heating medium or the walls of the chamber.

In such a device and process as described above, the plastic fiber tip is passed through the ferrule and abutted against a face of the heating medium and, at the same time, the sidewall of the end portion of the ferrule is heated, so that the plastic fiber is heated not only in the vicinity of the tip, but also in the melt zone of the ferrule in a global and uniform way and so that the lateral part of the plastic fiber is rendered easier to melt. As a result, the formation of a void between the melted plastic fiber and the ferrule is effectively prevented.

The plastic fiber thus treated is especially adapted to use in environments where temperature variations are high.

In addition, the configuration adapted for the heating medium has advantages in that the heating and cooling thereof is globally more efficiently done and that the handling thereof becomes easier and more adapted for a wide use.

BRIEF DESCRIPTION OF THE DRAWINGS

The above and other objects, features and advantages of the invention will be apparent from the following description of the preferred embodiments, given as a non-limiting example, with reference to the accompanying drawings, in which.

DETAILED DESCRIPTION OF THE PREFERRED EMBODIMENTS

A terminal treatment preparation process, in which a plastic fiber A is initially fitted into an adapted ferrule B, shall first be explained with reference to FIGS. 3 to 5.

The ferrule is made of a heat-conductive material such as a metal.

Figure 3:
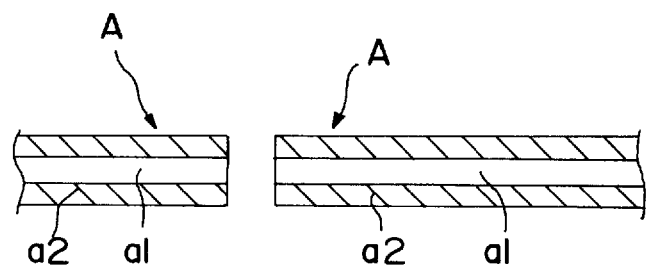
FIG. 3 shows a treatment operation involving the use of the terminal treatment device according to the invention.

In a first step, the plastic fiber A, which is comprised of a cladded core a1 and a coating a2, is cut as shown in FIG. 3.

Figure 4:
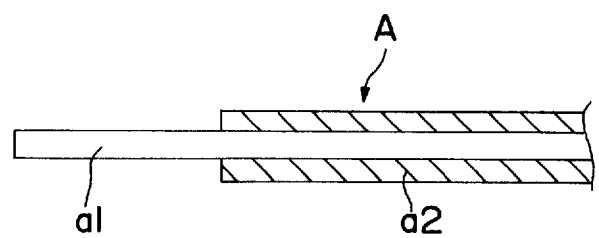
FIG. 4 shows another treatment operation involving the use of the terminal treatment according to the present invention.

In a second step, the coating a2 is peeled off as shown in FIG. 4.

Figure 5A:
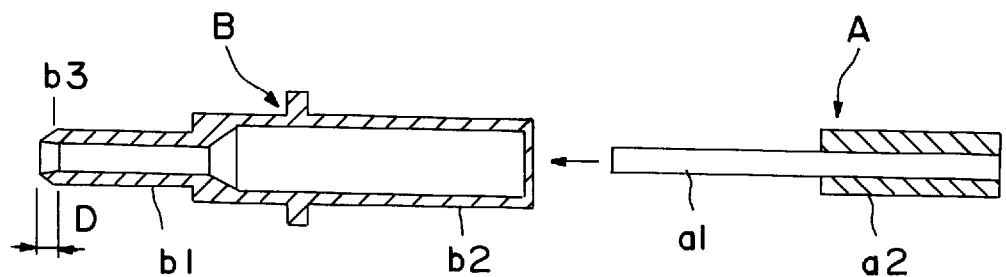
FIGS. 5a and 5b show other treatment operations involved in the present invention.
Figure 5B:
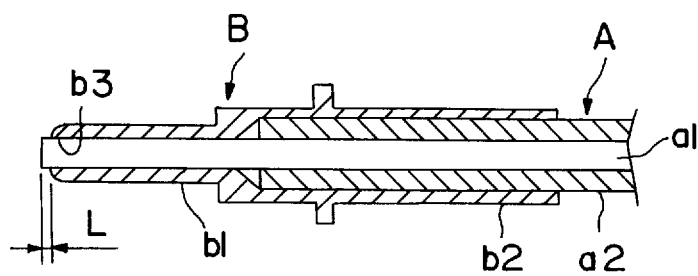

In a third step, shown in FIG. 5a, the exposed cladded core a1 of the plastic fiber is inserted into the ferrule B so that a predetermined length L of the cladded core a1 protrudes from the tip of the ferrule (FIG. 5b).

As can be seen from FIG. 5a, the ferrule B comprises a first sleeve portion b2 of relatively large diameter for supporting the coating a2 of the plastic fiber, and a second sleeve portion b1 of relatively small diameter for supporting the exposed cladded core a1 of the fiber.

Upon completion of the above terminal treatment preparation steps, the plastic fiber is thermally processed so that the second sleeve portion b1 becomes filled with melted cladded core a1 of the plastic fiber A.

To this end, there is defined at the end of the second sleeve portion b1 a melt zone b3 having a length D. The internal surface of the sleeve at the melt zone b3 forms a taper expanding towards the tip of the sleeve. The length L of the cladded core al protruding from the edge of the ferrule is determined as a function of the diameter of the cladded core a1 and the volume of the melt zone b3.

Next, there shall be described with reference to FIGS. 1 and 2 a device for treating the end part of the fiber A fitted in the ferrule B.

Figure 1:
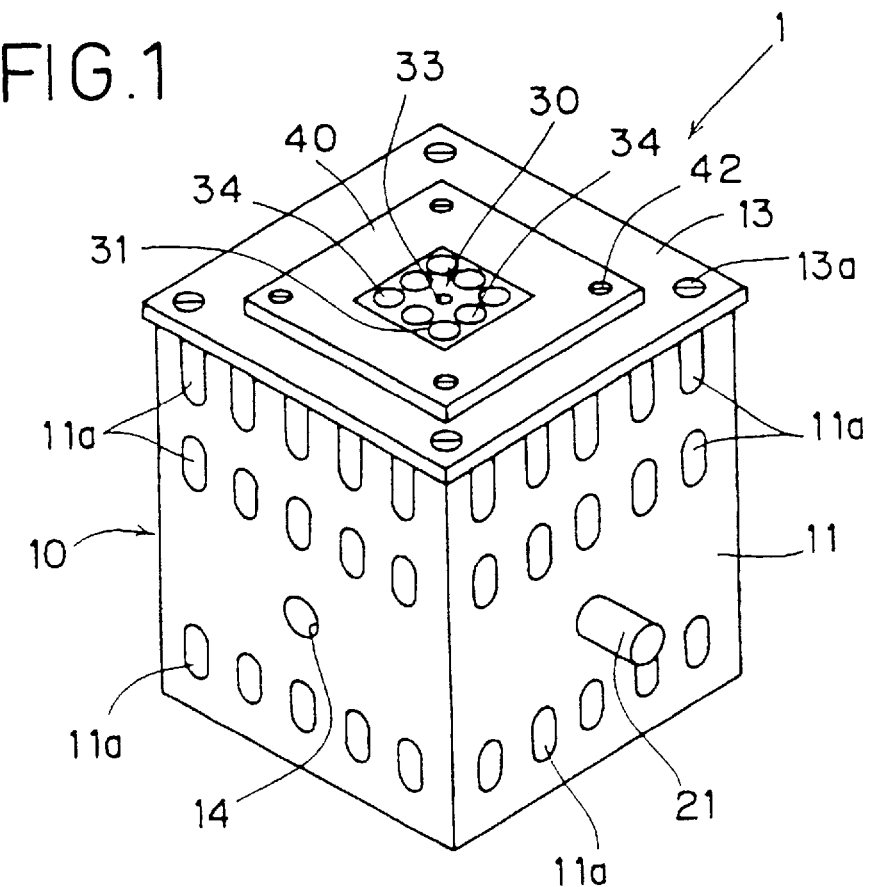
FIG. 1 shows a perspective view of a first embodiment of the a terminal treatment device according to the present invention.

The device 1 shown in FIG. 1 comprises a chamber 10 having an open face, a cover fixed thereon and composed of a heating medium 30, a base frame 13, a top frame 40 and a heating device disposed inside the chamber 10 (not shown in the figures). The heating medium 30 may be in the form of a heating plate.

Figure 2:
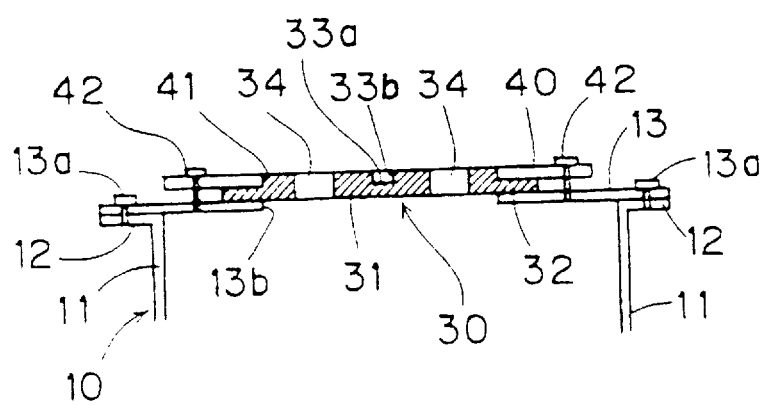
FIG. 2 is a partial sectional view of the device shown in FIG. 1.

As shown in FIG. 2, the heating medium 30 is a square or rectangular plate made of a metal having good thermal conductivity, such as copper, brass, aluminium, iron or the like. It comprises a relatively thick central area 31 and a thinner rim 32 surrounding the central area 31. The central, relatively thick, area 31 of the heating medium 30 has a centrally-located blind hole 33 for receiving an end portion of the ferrule B and a plurality of heat evacuation vents 34 around the blind hole 33. The heating medium 30 may alternatively be made of a non-metallic material having good thermal conductivity.

The base frame 13 and the top frame 40 both have a square or rectangular central aperture (respectively 13b, 41). The cross-sections of the outermost portions of the heating medium rim 32 are smaller than the corresponding cross-sections of the base frame 13 and the top frame 40 but larger than the cross-section of the two apertures (13b, 41). The rim 32 thus lies interposed between base frame 13 and top frame 40 and is held therebetween by screws 42 such that the thicker central area 31 fits inside the aperture 41 of the top frame 40.

The chamber 10 shown in FIG. 1 is provided with a plurality of vent-holes 11a through the sidewalls 11. The base frame shown in FIGS. 1 and 2 is fixed by screws 13a to a flange 12 formed on the upper portion of the sidewalls 11.

Inside the chamber 10 there are provided the aforementioned heating means and an elevator mechanism (not shown in the figures) which enables the heating means to approach to or move away from the heating medium 30. These movements can be operated from the outside through a positioning button 21 which protrudes from the sidewalls 11 of the chamber 10. The aforementioned heating means is provided with a temperature setting screw (not shown in the figures), which can be accessed by inserting a screwdriver through an access hole 14 formed in a sidewall 11 of the chamber 10.

The base 33a of the blind hole 33 functions as a pressing surface to carry out the treatment on the terminal of a plastic optical fiber passed through a ferrule. To this end, the base of the blind hole is preferably finished in a mirror-face fashion so as to produce a smooth end face of the plastic optical fiber.

Figure 6:
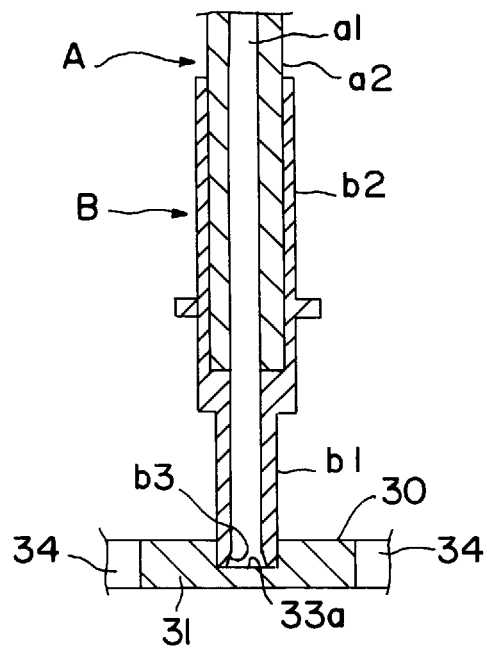
FIG. 6 shows a further treatment operation involving the present invention.

Next, the heating medium 30 is heated by operating the heater positioning button 21 so that the heating means is put into the contact with the underside of the heating medium 30. As shown in FIG. 6, when the end portion of the ferrule B containing a protruding cladded core a1 is inserted into the blind hole 33 and pressed, the end portion of the cladded core a1 of the plastic optical fiber A is heated not only by its end face, but also by the wall portions of the ferule B. Accordingly, the portion which is intended to correspond to the melt zone b3 fuses uniformly. In this way, the melt zone b3 is filled completely without producing a void and at the same time the mirror-face finish of the base 3a is imprinted on the end face of the cladded core a1 of the plastic optical fiber A.

Preferably, the heating means is preset by the temperature adjusting screw so that treatment temperature settles at the level of 180° C.

Subsequently, the heating means is moved away from the under-side of the heating medium 30 by operation of the heater positioning button 21 and the heating medium 30 is left to stand until the temperature decreases to below 120° C., i.e. the temperature at which molten plastic of the optical fiber solidifies. As described above, the present device is provided with a number of heat evacuation vents 34 in the heating medium 30. By virtue of this structure, the time taken for the heating medium 30 to cool down to below 120° C. is shortened by approximately 25% compared to a similar known device.

Figure 7:
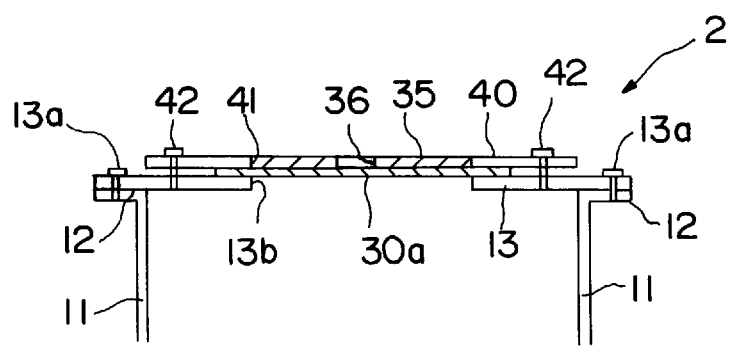
FIG. 7 shows a partial sectional view of a second embodiment of the invention.
Figure 8:
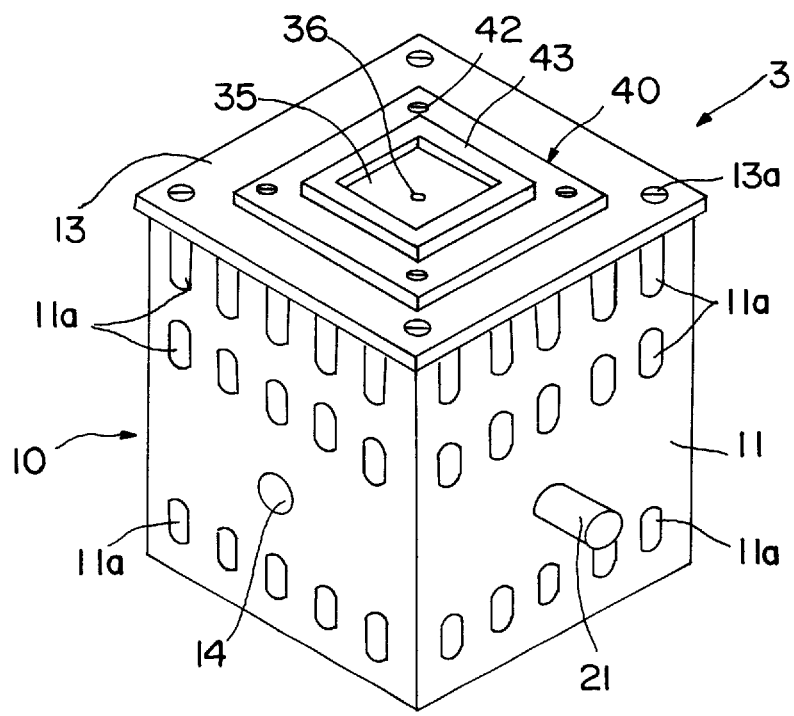
FIG. 8 shows a perspective view of a variant of the second embodiment of the invention.
Figure 9:
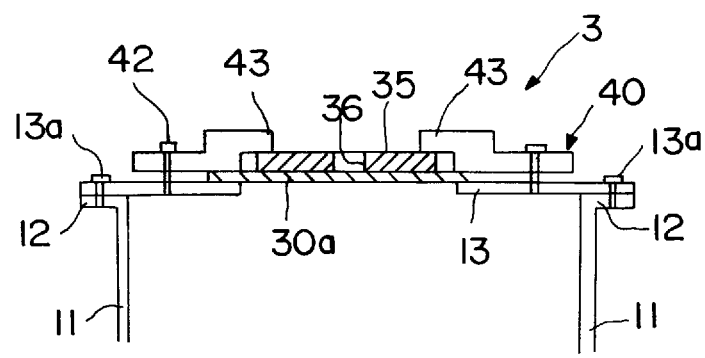
FIG. 9 is a partial sectional view of the variant shown in FIG. 8.
Figure 10:
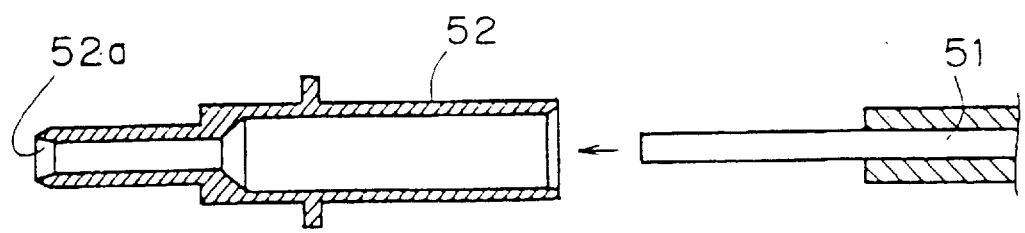
FIG. 10 shows a treatment operation according to a prior art terminal treatment process.
Figure 11:
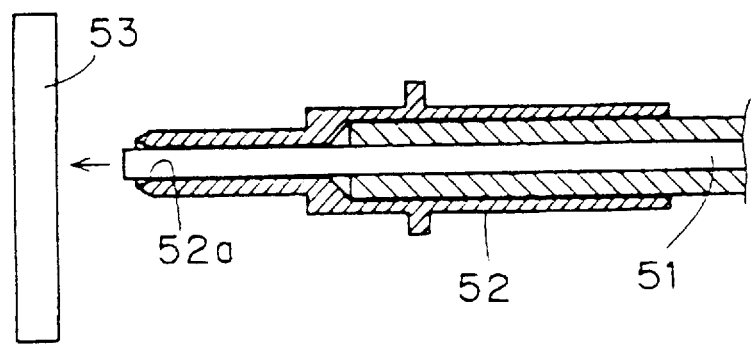
FIG. 11 shows another treatment operation according to the prior terminal treatment process
Figure 12:
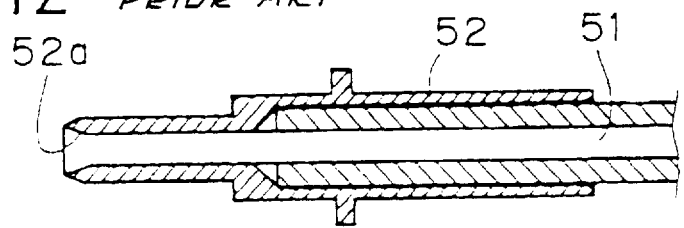
FIG. 12 shows another treatment operation according to the prior terminal treatment process.
Figure 13:
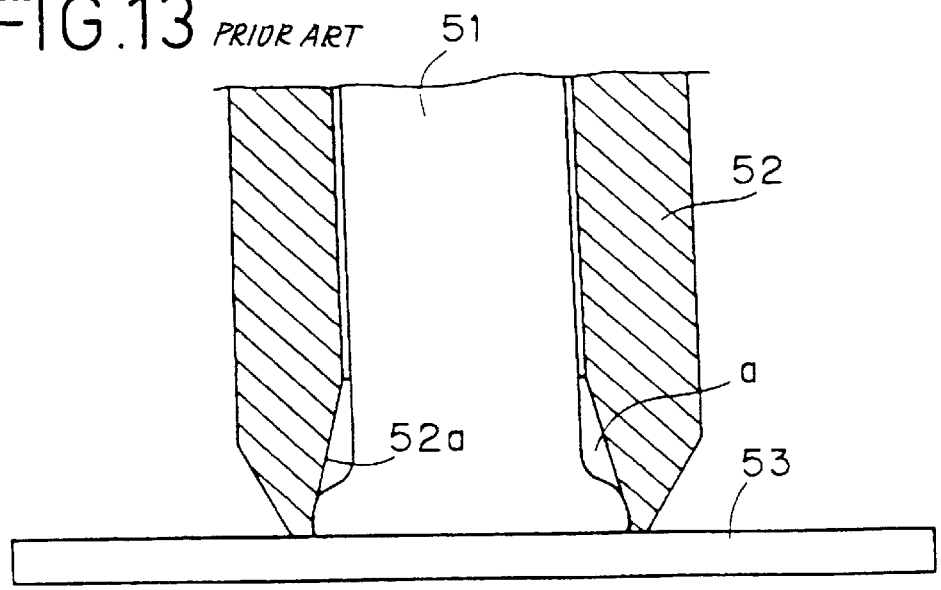
FIG. 13 shows a sectional view of the optical fiber and its ferrule after treatment by the prior terminal treatment process.
Figure 14:
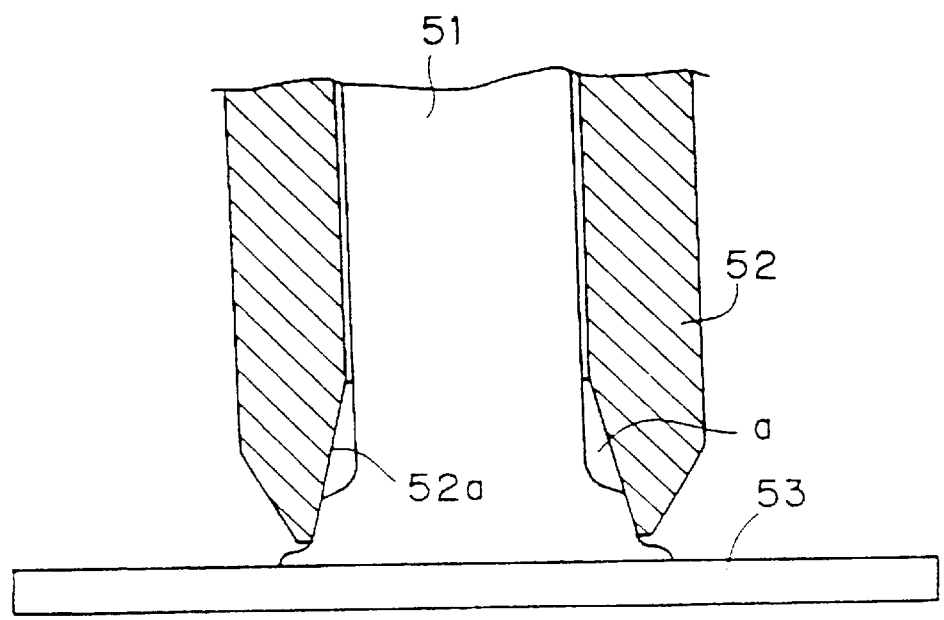
FIG. 14 shows another sectional view of the optical fiber and its ferrule after treatment by the prior terminal treatment process.

FIGS. 7, 8 and 9 show other embodiments of the invention. As the terminal treatment device 2 and 3 in these figures have approximately the same construction as in the preceding embodiment, the same construction elements are referred to by the same numbers. Only different elements are explained in the following part of the description.

The terminal treatment device 2 shown in FIG. 7 has a heating medium 30 which comprises two superposed plates. A base plate 30a is relatively thin and of uniform thickness. Its topmost side is finished in a mirror-face. As in the first-described embodiment, the base plate 30a is fixed on a base frame 13 of a chamber 10 by a top frame 40 and screws 42. A rest plate 35, made of a material having good thermal conductivity, is fitted into the aperture 41 of the top frame 40 and is disposed on the base plate 30a.

The central portion of the rest plate 35 is provided with a through hole 36 into which the tip of ferrule can be inserted. Thus, when the rest plate is fitted in the aperture 41 of the top frame 40, the upper side of the base plate 30a, which has a face with a mirror-like finish, is accessible through the hole.

Accordingly, when the base plate 30a is heated by the heating means within the chamber 10, the rest plate 35 is simultaneously heated.

For the treatment, the plastic optical fiber prepared as described is passed through a ferrule so that the tip of the cladded core protrudes a little from the ferrule B. When the tip portion of the ferrule is fitted into the through hole 36 in the rest plate 35 and pressed onto the upper face of the base plate 30a, it is also heated by the contact between its sidewalls and confronting sidewall of the hole 36. In this way, an effective terminal treatment can be achieved in the same way as in the preceding embodiment.

Further, in this terminal treatment device 2, the rest plate 35 is simply superposed to a base plate 30a, so that the rest plate 35 can easily be removed. Once the rest plate is removed, the base plate 30a may be used as in a classical terminal treatment device, if needs be.

Another advantage of the above-described construction is that it can easily be derived from an existing device simply by superposing the rest plate 35 on the heating medium of the known device which serves as a base plate.

If the rest plate 35 is also provided with a heat evacuation vent such as in the present example, the natural cooling time may be shortened. This possibility is not shown in FIGS. 7 to 9.

FIGS. 8 and 9 show a variant of the terminal treatment device 2 illustrated in FIG. 7. The device 3 differs from the one of FIG. 7 by the fact that the rest plate clamp 43 is integrally formed with the top frame 40 and that the rest plate 35 and the base plate 30a are together inserted and fixed between the top frame 40 and the base frame 13. As the rest plate 35 is fixed in a detachable way, a known terminal treatment device can be transformed into the terminal treatment device according to the present invention, and vice versa.

The rest plate 35 in the terminal treatment device 3 may of course be provided with some form of heat evacuation vent to shorten the natural cooling time.

It is recalled that the present invention involves first passing a plastic optical fiber through a ferrule and thereafter inserting and pressing the end of the fiber into a blind hole formed in a heating medium. The plastic optical fiber is then heated not only by the end face but also by its sidewalls, so that the corresponding portion fuses uniformly and fills the melt zone without forming a void.

For this reason, even if the melt zone is deep, an optimum terminal treatment can be effected and subsequent cold and hot impact testing does not generate cracks or micro-cracks. Also, heat evacuation vents formed in the heating medium shorten natural cooling time, thereby improving work efficiency.

In the device wherein the heating medium and the rest plate are combined, the device can be used as a classical terminal treatment device after removal of the rest plate. This type of device has a large utility and is easier to clean. This is especially true in the type of device where the rest plate is fitted against the frame, for in this case the setting and removal of the deposit plate are very easy, and working efficiency is thus considerably improved.

We claim:

1. A device for fixing a ferrule to a fiber terminal which comprises a thermoplastic cladded core, a leading end of said core being inserted through said ferrule, a tip of said core protruding from said ferrule, and said ferrule having a melt zone adjacent said tip, said device comprising:
   (a) a chamber;
   (b) a heated element mounted on said chamber so as to form a portion of a wall of said chamber, said heated element including a central area having a blind hole therein, said hole having a base and a side wall, said side wall having a height corresponding to said melt zone, and said blind hole adapted to receive said melt zone whereby, when said tip is inserted into said hole, said melt zone is in contact with said side wall and said tip is in contact with said base; and
   (c) a heater positioned within said chamber for heating said central area.

2. The device of claim 1 wherein said heated element has a relatively thin rim and said central area is peripherally surrounded by said relatively thin rim.

3. The device of claim 2 wherein said chamber has a cover and said cover comprises a base frame having a central aperture, a top frame mounted on said base frame and having a central opening, said central area located in said central aperture.

4. The device of claim 3 wherein said rim is secured between said base frame and said top frame.

5. The device of claim 1 wherein said heated element comprises a base plate and a rest plate detachably mounted on said base plate, said rest plate constituting said central area, said rest plate having a smaller surface area than said base plate such that said rest plate defines a peripheral rim on said base plate.

6. The device of claim 5 wherein said top frame has a step-wise structure configured so as to hold both said rest plate and said base plate.

7. The device of claim 1 wherein said base of said blind hole is provided with a mirror surface.

8. The device of claim 1 wherein said heated element is a metal plate.

9. The device of claim 1 wherein said heated element is provided with a plurality of heat evacuation vents.

10. The device of claim 5 wherein said base plate and said rest plate are provided with a plurality of heat evacuation vents.

11. The device of claim 3 wherein said chamber has walls to which said base frame is secured.

12. The device of claim 11 wherein said walls of said chamber are provided with at least one heat evacuation vent.

13. The device of claim 1 comprising a positioning mechanism for moving said heater toward and away from said heated element.

14. The device of claim 13 wherein said positioning mechanism is adapted to bring said heater into contact with said heated element.

15. The device of claim 1 wherein said heater is provided with a temperature setting mechanism.

16. A method for fixing a ferrule to a fiber terminal which comprises a thermoplastic cladded core, said method comprising passing a leading end of said core through said ferrule so that a tip of said core protrudes from said ferrule and said ferrule having a melt zone adjacent said tip, providing a heated element wherein said heated element is mounted on a chamber so as to form a portion of a wall of said chamber, said heated element including a central area having a blind hole therein, said hole having a base and a side wall, said side wall having a height corresponding to said melt zone, and said blind hole adapted to receive said melt zone, and said chamber having a heater positioned within said chamber for heating said central area, inserting said tip and said melt zone of said ferrule into said blind hole so that said tip is in contact with said base and said melt zone is in contact with said side wall, heating said heated element whereby said tip and said melt zone are heated through said base and said side wall, thereby melting said thermoplastic cladded core located at said tip and said melt zone and causing said thermoplastic cladded core to uniformly fill said melt zone of said ferrule and render said fiber terminal non-withdrawable from said ferrule.

17. The method of claim 16 wherein said core of said fiber terminal is surrounded by a coating, and said method comprising stripping a portion of said coating to expose said leading end prior to passing said leading end through said ferrule.

* * * * *